US008839284B2

(12) United States Patent
Williamson et al.

(10) Patent No.: US 8,839,284 B2
(45) Date of Patent: Sep. 16, 2014

(54) METHODS AND APPARATUS FOR CONTROLLING CONTENT DISTRIBUTION

(75) Inventors: Louis D. Williamson, Denver, CO (US); Tom Gaebel, Lexington, SC (US)

(73) Assignee: Time Warner Cable Enterprises LLC, New York, NY (US)

( * ) Notice: Subject to any disclaimer, the term of this patent is extended or adjusted under 35 U.S.C. 154(b) by 486 days.

(21) Appl. No.: 12/409,941

(22) Filed: Mar. 24, 2009

(65) Prior Publication Data

US 2010/0169914 A1     Jul. 1, 2010

Related U.S. Application Data

(60) Provisional application No. 61/142,184, filed on Dec. 31, 2008.

(51) Int. Cl.
*H04N 7/16* (2011.01)
*H04N 21/262* (2011.01)
*H04N 21/6338* (2011.01)
*H04N 21/222* (2011.01)

(52) U.S. Cl.
CPC .......... *H04N 21/2221* (2013.01); *H04N 7/165* (2013.01); *H04N 21/26208* (2013.01); *H04N 21/6338* (2013.01)
USPC ............................................... 725/28; 725/31

(58) Field of Classification Search
None
See application file for complete search history.

(56) References Cited

U.S. PATENT DOCUMENTS

| 7,895,614 B2* | 2/2011 | Tsuria et al. ............... 725/25 |
| 8,233,623 B2* | 7/2012 | Wingert et al. ............ 380/258 |
| 2007/0226765 A1* | 9/2007 | Bahnck et al. .......... 725/63 |
| 2008/0066103 A1* | 3/2008 | Ellis et al. .............. 725/38 |

* cited by examiner

*Primary Examiner* — Cai Chen
(74) *Attorney, Agent, or Firm* — Straub & Pokotylo; Michael P. Straub; Stephen T. Straub (57) ABSTRACT

Methods and apparatus for controlled distribution of program content are described where program content for certain regions may be selectively blocked. The described methods and apparatus allow content distribution to authorized regions while providing control to the content provider to effectively block program content delivery to regions not entitled to receive the program content.

25 Claims, 5 Drawing Sheets

METHODS AND APPARATUS FOR CONTROLLING CONTENT DISTRIBUTION

RELATED APPLICATIONS

The present application claims the benefit of U.S. Provisional Patent Application Ser. No. 61/142,184, filed Dec. 31, 2008 titled "METHODS AND APPARATUS FOR CONTROLLING CONTENT DISTRIBUTION", which is assigned to the assignee of the present application and which is hereby expressly incorporated by reference.

FIELD OF THE INVENTION

The present invention relates to methods and apparatus for controlling delivery of program content, and, more particularly, to methods and apparatus that support controlled blocking of program content delivery in some regions, e.g., certain geographic regions on a selective basis.

BACKGROUND OF THE INVENTION

Content distribution, e.g., distribution of video programs and/or other content over large geographic regions is often performed using satellites to transmit the program content to be distributed to multiple locations at the same time. Thus, through the use of satellites, the need to transmit the same content to multiple locations though land based connections can be avoided. Satellite distribution of content has commercial advantages in that content delivery to multiple locations dispersed over large geographic regions can be achieved without the need for land based connections between the dispersed locations. Satellite distribution often allows for the distribution of valuable program content such as sporting event programs in real time or near real time. Some such programs may be subject to geographic region based program content distribution restrictions.

Generally, the cost of having multiple satellite receiver stations has been less costly than the cost of bandwidth which would be needed to distribute large amounts of content via land based links to multiple local distribution centers serving various geographic regions throughout the country. In addition, the use of satellite distribution in combination with satellite receivers at local distribution centers has offered a relatively high degree of control since the satellite receivers at different distribution centers could be controlled so as not to decode and distribute content on a per satellite receiver basis thereby preventing content delivery to the region served by a particular receiver satellite.

Figure 1:
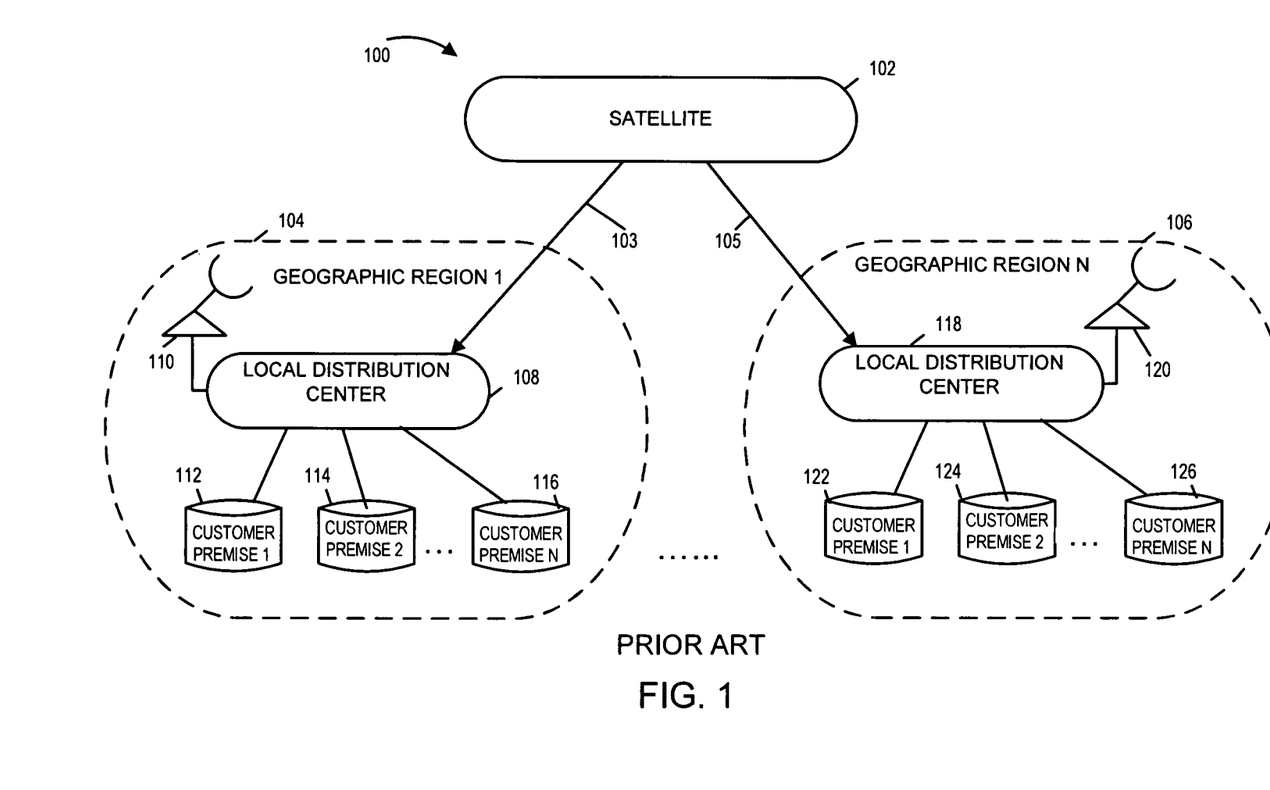
FIG. 1 illustrates a known content distribution system.

FIG. 1 illustrates a known distribution system 100 used for program content delivery and distribution. Satellite 102 has links, e.g., satellite communication links 103,105, with a plurality of different local distribution centers 108, 118 located in different geographic regions 104, 106, respectively. Local distribution center 108 includes a satellite receiver 110 while local distribution center 118 includes a satellite receiver 120, for receiving content from the distribution network 102. The distribution system 100 distributes, via satellite 102, the program content to a plurality of N local distribution centers 108, 118, located in different geographic regions 104, 106. For example, as shown in FIG. 1 the distribution system 100 includes local distribution centers 108, 118 corresponding to geographic regions 1 104 and N 106, respectively.

Each of the geographic regions 1 104, and N 106, serviced by one of the local distribution centers 108, 118 has a corresponding set of customer premises, e.g., customer premise 1 112, customer premise 2 114, ..., customer premise N 116 in region 1 104 and customer premise 1 122, customer premise 2 124, ..., customer premise N 126 in region N 106. The local distribution centers, e.g., local distribution center 108, 118, included in geographic region 104, 106, each serve a plurality of customers.

While the known approach to content distribution using satellites allows for content distribution restrictions to be implemented at a geographic region level which is relatively localized, this is due to the presence of satellite receivers at a relatively local level. Maintaining large numbers of satellite receivers at numerous locations can be costly. As the cost of land based distribution networks continues to decrease, it would be desirable if the number of satellite receiver stations could be decreased without limiting the ability to control program distribution blackouts on a relatively localized geographic region basis using the same satellite communications link used to provide program content for distribution.

SUMMARY OF THE INVENTION

Methods and apparatus for distributing content via satellite while enabling blackout of program content delivery to individual geographic regions are described.

In accordance with the invention, rather than providing an individual satellite receiver for each individual geographic region which may be subject to a program blackout, a satellite receiver is located at a network head end which supplies content to multiple local content distribution systems, e.g., local cable office or headend, via a delivery network, e.g., a ring network used in some embodiments for content delivery.

While a single copy of program content may be received via satellite at the network distribution headend, the headend delivers individual copies of the content via the delivery network to each local content distribution system, e.g., using output ports and/or IP addresses corresponding to the individual local content distribution systems. While this approach results in greater network loading as compared to using a broadcast address to deliver the content over the delivery network, it allows for program content to be blocked in the network headend serving multiple geographic regions based on regional blackout information and/or commands.

In accordance with one feature of the invention, program blackout commands specifying that program content should be restricted from delivery to specific geographic regions may be transmitted via satellite to the distribution network headend. In this manner, content sources, e.g., providers of satellite content feeds, can control blackout implementation through use of the same satellite link used to distribute the content. In this manner, the content provider can control content distribution directly without having to rely on operators at regional or local distribution sites, e.g., local cable offices.

Furthermore, by having content distribution implemented in the distribution network headend rather than individual local distribution centers, the content distribution and substitution remains somewhat centralized with content substitution being performed at relatively few locations nationwide even though the blackout restrictions maybe specified as corresponding to relatively small geographic regions which maybe only a small subset of the geographic regions served by an individual regional distribution center.

While in some embodiments, the region subject to a content distribution blackout is indicated in a blackout command by specifying the name of a geographic region, in some embodiments the region is identified by supplying a port and/or IP address used by the distribution network headend to distribute content via the distribution network to the region subject to the blackout. Providing such information identifying the region subject to the blackout can facilitate implementation of the blackout and/or content substitution operation at the distribution network headend eliminating or avoiding the need for the distribution network headend to map geographic region names to port and/or IP addresses affected by a regional blackout restriction.

Alternative content may optionally be specified for delivery in place of program content which is prohibited from delivery to a geographic region subject to a blackout command.

Numerous additional methods, features, apparatus and benefits of the present invention are discussed in the detailed description which follows.

It should be appreciated that all features need not be used or included in all embodiments and that a wide variety of content distribution methods are possible.

Various additional features and advantages of the present invention are discussed in the detailed description which follows.

DETAILED DESCRIPTION

The present invention relates to methods and apparatus for controlling delivery of program content to a region, and, more particularly, to methods and apparatus that support controlled blocking of program content delivery in some regions, e.g., one or more geographic regions. In accordance with the invention port and/or IP address information can be used to control which geographic region is blocked with regard to the distribution of particular program content.

Figure 2:
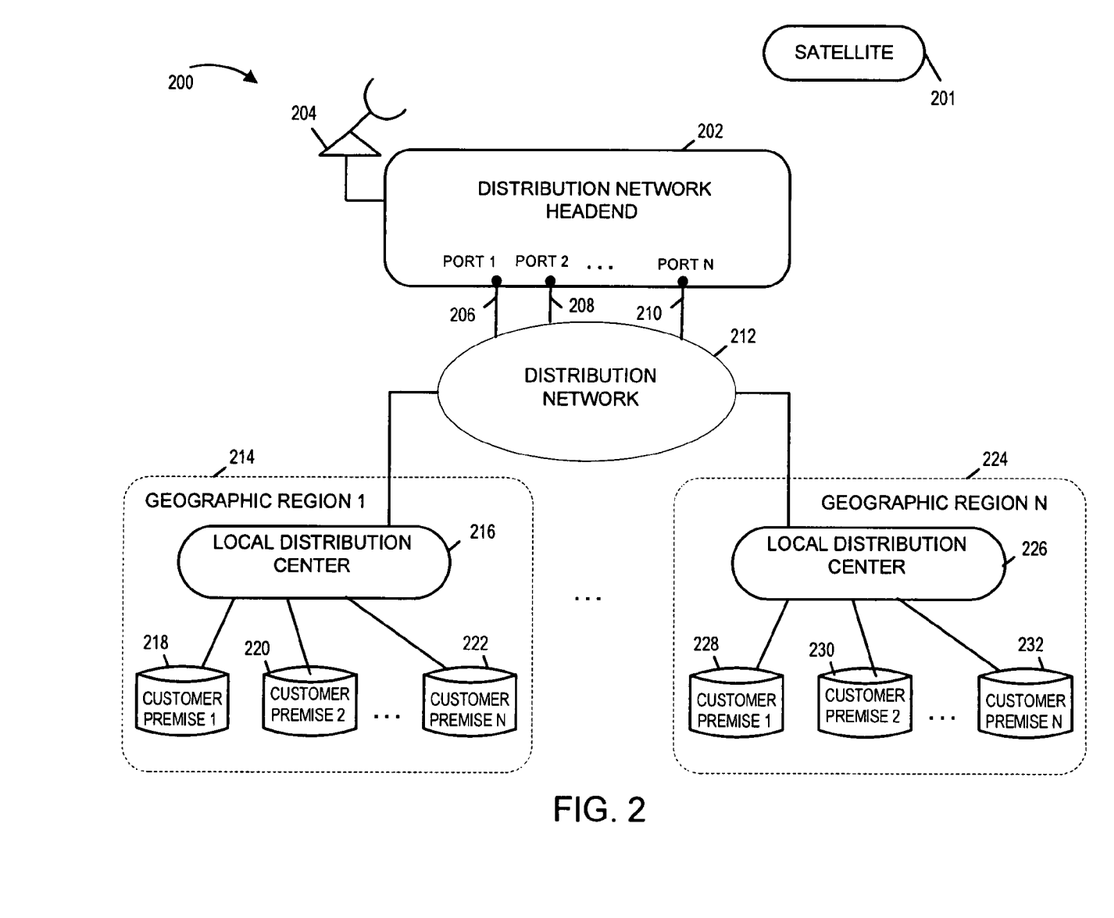
FIG. 2 illustrates an exemplary distribution system implemented in accordance with the invention.

FIG. 2 illustrates an exemplary distribution system 200 implemented in accordance with an exemplary embodiment of the invention.

The distribution system 200 includes a satellite 201 for transmitting, e.g., relaying, program content and commands from one or more content sources, e.g., program content providers. In addition to satellite 201 the system 200 includes a distribution network headend 202 including a satellite receiver 204, a distribution network 212, and a plurality of local geographic regions 214, . . . , 224, each including one or more local distribution centers 216, 226 which are coupled to the distribution network 212. The distribution network may be implemented as a ring network and is used to provide content from the regional network headend to the various distribution centers coupled to the network ring. In various embodiments distribution network headend 202 is implemented as a land based network implemented using, e.g., fiber optic cable. It should be appreciated that a local geographic region may, and sometimes does, include more than one local distribution center. Also shown in FIG. 2, are customer locations served by each local distribution center, e.g., customer premise 218, customer premise 220 etc. served by local distribution center 216 and customer premise 228, customer premise 230, etc., served by local distribution center 226.

The distribution network headend 202 receives content from, e.g., a content source, e.g., a content provider which transmits to satellite 201 for distribution. Received content may include a variety of programs, movies, T.V shows, on-demand content etc. The distribution network headend includes a satellite receiver 204 via which the content communicated by a remote content provider is received via a satellite link by the distribution network headend 202. The distribution network headend includes an output interface that supports a plurality of ports, e.g., port 1 206, port 2 206, . . . , port N 210 which can be used to distribute content. It should be appreciated that the ports of an interface used for outputting data, commonly referred to as output ports, can have a set relationship to an application type, e.g., a content distribution application, IP address, and/or region depending on how a system designer or an administrator has configured the distribution system. In some embodiments, the distribution network headend 202 may deliver program content for, e.g., a local distribution center 216, 226 using a port number designated for use in distributing content to a specific local distribution center. However, in some other embodiments the distribution network headend 202 is configured to deliver program content for, e.g., a regional distribution center, based on a port number and IP address combination where the IP address is normally a non-broadcast address corresponding to a local distribution center.

A satellite receiver 204 at the distribution network headend 202 receives content and supplies it to the distribution network 212 for delivery to the individual local distribution centers 224. In accordance with the invention while a single satellite feed may be received at network headend 202, multiple discrete copies of the received content may be sent over the distribution network 212, e.g., with a separate copy in the form of one or more packets being sent to each local distribution center authorized to distribute the particular program content. Local distribution centers which are not to receive particular content are not sent and are thus blocked from receiving the satellite content, or are supplied with alternative content. While the sending of multiple individual content streams which often contain the same program content over distribution network 212 may increase network loading as compared to a broadcast distribution approach, the individual stream approach has the advantage of placing control over content distribution and geographic based program blackouts at the distribution network headend as opposed to at the individual local distribution centers 216, 226.

The distribution network 212 receives content streams, e.g., program content, output by the distribution network headend 202 and distributes the received content streams to the distribution centers which are serviced by the distribution network headend 202. For example, in some embodiments the distribution network 212 receives various data packets including the program content.

Local distribution centers, e.g., distribution center 216, 226 monitors for data packets which have their destination address, e.g., an IP address corresponding to that particular geographic region/distribution center. In accordance with the present invention, in some embodiments when a program content distribution is blocked at the distributor headend output interface, then local distribution centers will not receive data packets including the blocked program content. In some embodiments, the distributor headend is configured to output alternative program content to regions where particular program content is to be blocked. In some such embodiments, the local distribution centers for which program content is blocked, receive the alternative program content through the distribution network 212.

Figure 3:
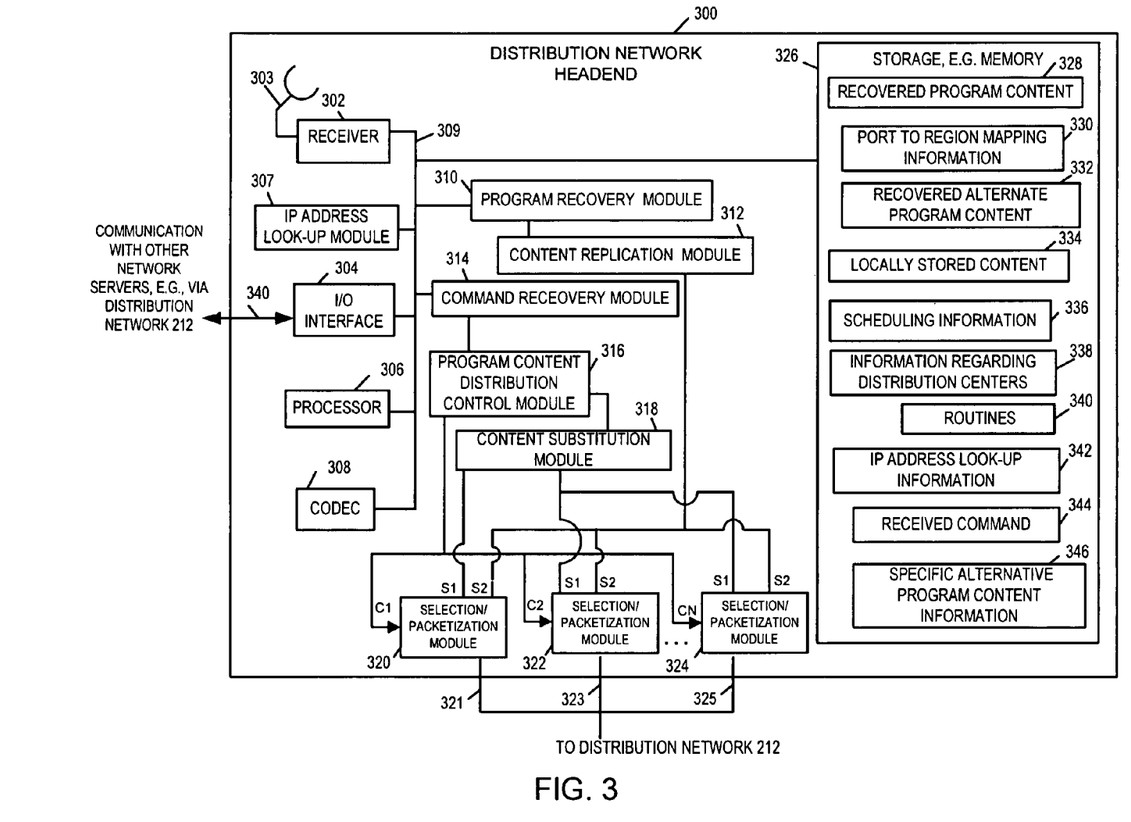
FIG. 3 illustrates an exemplary distribution network headend which can be used in the system of FIG. 2.

FIG. 3 is a drawing of an exemplary distribution network headend 300 which can be used as the distributor network headend 202. The distribution network head end 300 support selective duplication and delivery of program content to various local distribution centers in accordance with the various embodiments of the present invention. The distribution network head end 300 includes a receiver 302, an I/O interface 304, a processor 306, an IP address look-up module 307, a codec 308, a storage device 326, a program recovery module 310 and a command recovery module 314 coupled together by a bus 309. The receiver 302 is coupled to a satellite dish, e.g., antenna 303, for receiving content to be distributed from a satellite, e.g., satellite 201.

The various elements of the distributor network headend 300 can exchange data and information over the bus 309. Via the I/O interface 304, the distributor network headend 300 can exchange signals and/or information with other devices/servers/networks, e.g., a national content storage server which stores additional programs, movies etc., via, e.g., distribution network 212. For example, the I/O interface 304 may support the receipt and/or transmission of content to/from a national content server as represented by arrow 340. The I/O interface 304 further supports the communication of application and/or control signals between the distributor network headend 300 and other servers, distribution centers and sub-systems, e.g. local/regional distribution centers 104 and 106.

The satellite receiver 302 receives signals including, for example, content and command signals. The received content may include content subject to geographic based distribution restrictions while the command signals may include commands used to restrict or control content distribution, e.g., to enforce region based program blackouts. The commands may be supplied by the provider of the content being distributed and can be used to block out distribution to individual regions and/or control the supply of alternative content to particular local geographic regions. Received content may include, e.g., program content from a content provider, alternative program content to be delivered in place of a blocked program etc.

The processor 306, e.g., a CPU, executes routines 340 stored in the memory 326 and, under direction of the routines 340, controls the distributor network headend 300 to operate in accordance with the invention. To control the headend 300, the processor 306 uses information and/or routines including instructions stored in memory 326. The processor 306 may control codec 308 which is a combined coder/decoder to perform various decoding and/or re-encoding operations on received content prior to distribution via distribution network 212. Thus, codec 308 can be used to support transcoding so that content will be received by individual local distribution centers in formats and at rates best suited for the particular local distribution center to which a content stream is sent even though it may be received from satellite 201 in a different format or having a different data rate.

In addition to the above described elements, the headend 300 also includes a content replication module 312 coupled to the program recovery module 310, a program content distribution control module 316, a content substitution module 318 and a plurality of selection/packetization modules 320, 322, 324, each corresponding to a different local distribution center which can be an output port number and/or port/IP address pair used by the distribution network headend 300 to stream packets including program content to an individual local distribution center. Each of the selection/packetization module, i.e., selection/packetization module 320, 322, . . . , and 324 has two selection inputs S1 and S2 which are either open for supplying content or closed depending on a control signal from the content distribution control module 316, e.g., control signal C1, C2, . . . , CN as shown in FIG. 3. In addition to the controllable inputs, each selection module also has an output, which feeds the content output from the selection module to a distribution network, e.g., distribution network 212 of FIG. 2. Input S1 of each of the selection modules 320, 322, . . . , 324 is coupled to the content substitution module 318. Each of the selection inputs S2 of each of the selection modules 320, 322, . . . , 324 is coupled to the content replication module 312. The program recovery module 310 is responsible for processing the received program content and recovering the program to be distributed to various local/regional distribution centers, e.g., local distribution center 216 and 226. In some embodiments, the program recovery module 310 is also responsible for putting the recovered program content in a suitable format for distribution to various local distribution centers. The program recovery module 310 may use codec 308 for transcoding functions and/or when a reduction in data rate is to be achieved through the use of decoding/re-encoding prior to distribution to one or more local distribution centers. As noted above, received program content may and in many embodiments is, duplicated and distributed to local distribution centers via separate and independent packet streams, e.g., non-multicast packet streams.

The content replication module 312 is coupled to the program recovery module 310, and is configured to replicate the received program content for delivery to a plurality of different regional distribution centers. The distribution of the duplicated content is achieved using at least one of i) different ports and ii) different IP addresses to indicate which of the different regional distribution centers particular content is directed to. In this manner, packets containing duplicated content can be distributed using individual packet streams directed to individual local distribution centers The blackout of individual geographic regions and distribution of content is controlled under the direction of commands received, e.g., along with content to be distributed via the satellite downlink. Command recovery module 314 is responsible for processing commands received from a remote location, e.g., via satellite from a content provider at a remote location, to determine if the distribution of a program included in the received content is to be blocked from delivery to a particular local region. The command recovery module 312 recovers commands from received satellite signals and then supplies the commands to program content distribution control module 316 which is responsible for controlling distribution in accordance with the received commands. In accordance with the commands, content may be distributed to specific local regions, blocked from distribution to specific regions and/or alternative content may be distributed to a local distribution center in place of blocked content. The alternative content may be specified by a received command or determined by the local distribution center or distribution network headend. The alternative content in some embodiments is an alternative content stream received via the satellite link. In other embodiments the alternative content is obtained from content stored at the distribution network headend.

In some embodiments the recovered commands supplied to the control module 316 indicate the region for which the content delivery is to be blocked by specifying at least one of: i) a port number and ii) an IP address corresponding to the region to which content delivery is to be blocked. In some embodiments the command includes information identifying a geographic region from which program content is to be blocked. For example the command may indicate or specify a geographic region identifier corresponding to a region for which the program content delivery is to be blocked. In some embodiments, the information identifying a geographic region is a name of the geographic region. In such embodiments the distributor headend 300 may use the IP address lookup module 342 for determining, from the information identifying the geographic region, an IP address of a distribution center, e.g., a regional distribution center, serving the identified geographic region. In some other embodiments, the command may include port number and/or IP address information corresponding to a region to which content delivery is to be blocked.

In order to implement a received content distribution control command, program distribution control module 316 controls one or more of selection/packetization modules 320, 322, 324 to select between outputting content corresponding to a received program or alternate content. As can be seen in FIG. 3, the selection/packetization modules 320, 322, 324 can output substitute programming content by packetizing and streaming the content supplied to substitute content input S1 or output the regular program content, e.g., when it is not subject to blackout restrictions, by packetizing and streaming the content supplied to the second input S2. While the use of separate switching devices 320, 322, 324 under the control of control module 316 is shown with each switching module corresponding to a different local distribution center, it should be appreciated that the switching between regular program content and alternative program content in response to a received command may be implemented in a plurality of ways.

It should be appreciated that routers and/or other content distribution systems can be configured so that a port maps to a particular application, combination of application and IP address and/or some other identifier, e.g., a region identifier, that can be configured by a system administrator. Thus, ports of an interface used for outputting data, commonly referred to as output ports, can have a set relationship to an application type, IP address, and/or region depending on the system configuration. Therefore it should be appreciated that the distribution control module 316 may control the headend to, in some embodiments, disable a port at the distributor network headend 300 that outputs the content to the distribution ring, e.g., distribution network 212 of FIG. 2.

Content substitution module 318, among other things, is responsible for outputting alternative program content to be supplied in place of content which is being blocked with regard to a specific geographic region for which a command indicates program content is to be blocked. The alternative content is selected and output on a per region basis, e.g., based on information included in a received command.

Having described various elements which are used to distribute content, block content for particular regions and/or supply alternative content, the various data, routines and other elements stored in memory used to implement the methods of the invention will now be discussed further. The memory 326 includes various stored information and storage modules, e.g. such as the recovered program content 328 which stores the program content recovered by the program recovery module 310. Prior to supplying the program content to a plurality of regional distribution centers, the content replication module 312 uses the recovered program content 328 to replicate received content. The memory further includes a port to region mapping information 330, recovered alternative program content 332, locally stored content 334, scheduling information 336, information regarding distribution centers 338, routines 340, IP address look-up module 342, received command 344 and specific alternative program content information 346. The port to region mapping information 330 stores information regarding different ports corresponding to different application, e.g., video, audio etc., in different regions. For example, in one embodiment port to region mapping information 330 includes information as to what port(s) in a geographic region, e.g., geographic region 1 214 of FIG. 2, support the video and audio applications. In some embodiments, the headend 300 uses this port to region mapping information 330 to disable the corresponding port(s) at the output interface e.g., port/IP address pair 1 321.

Recovered alternate program content 332 stores alternate program content communicated by the content provider in the event a specific alternate program is indicated for distribution in place of the blocked program content. For example, in some embodiments it may be desired by the content provider that a specific program targeted specially for a region and/or the customers in that region, be distributed in place of the blocked program content. In such an event, the content provider may send specific alternate program content for use in replacing the blocked program in the regions. Alternatively, in some other embodiments, alternative program content may be locally stored in the locally stored content 334.

Scheduling information 336 stores the timing and scheduling information, communicated by the content provider, about the time and/or the period of time for which the program content delivery is to be blocked for a region or regions. Scheduling information 336 may and in some embodiments is, used by program content distribution module 316 in combination with received commands to determine what content to deliver at a particular point in time. For example, if a pay per view program is to be broadcasted, e.g., from 9:00 PM to 11:00 PM, then, in some embodiments, the content provider would communicate this timing/scheduling information to the headend 300 so that the headend 300 can schedule and block the delivery of program content in a specified region accordingly. In some embodiments scheduling information 336 also includes information regarding the time when one or more alternative program content should be distributed.

Information regarding distribution centers 338 includes, e.g., information mapping different distribution centers to different geographic areas that the distribution center is serving. For example, in one embodiment information regarding distribution centers 338 includes information that geographic area 1 214 is being served by local distribution center 216, geographic area N 224 is being served by local distribution center 226 and so on. Routines 340 include communications routines and/or distributor network headend control routines.

IP address look-up information 342 includes information, e.g., a look-up table, that maps a local distribution center serving a geographic region, to an IP address associated with that distribution center. In some embodiments, the look-up information 342 is dynamically updated when a dynamic IP address associated with a distribution center changes. In some other embodiments it is also possible that a static IP address may be associated with a distribution center and in such cases an entry associated with such a distribution center in the look-up information 342 remains unchanged. The IP address look-up module 307 uses IP address look-up information 342 for determining from the information identifying a geographic region, an IP address of a distribution center serving the identified geographic region.

Received command 344 is a received command which is temporarily stored after it is recovered by the command recovery module 314 prior to use by the distribution control module 316.

Figure 4:
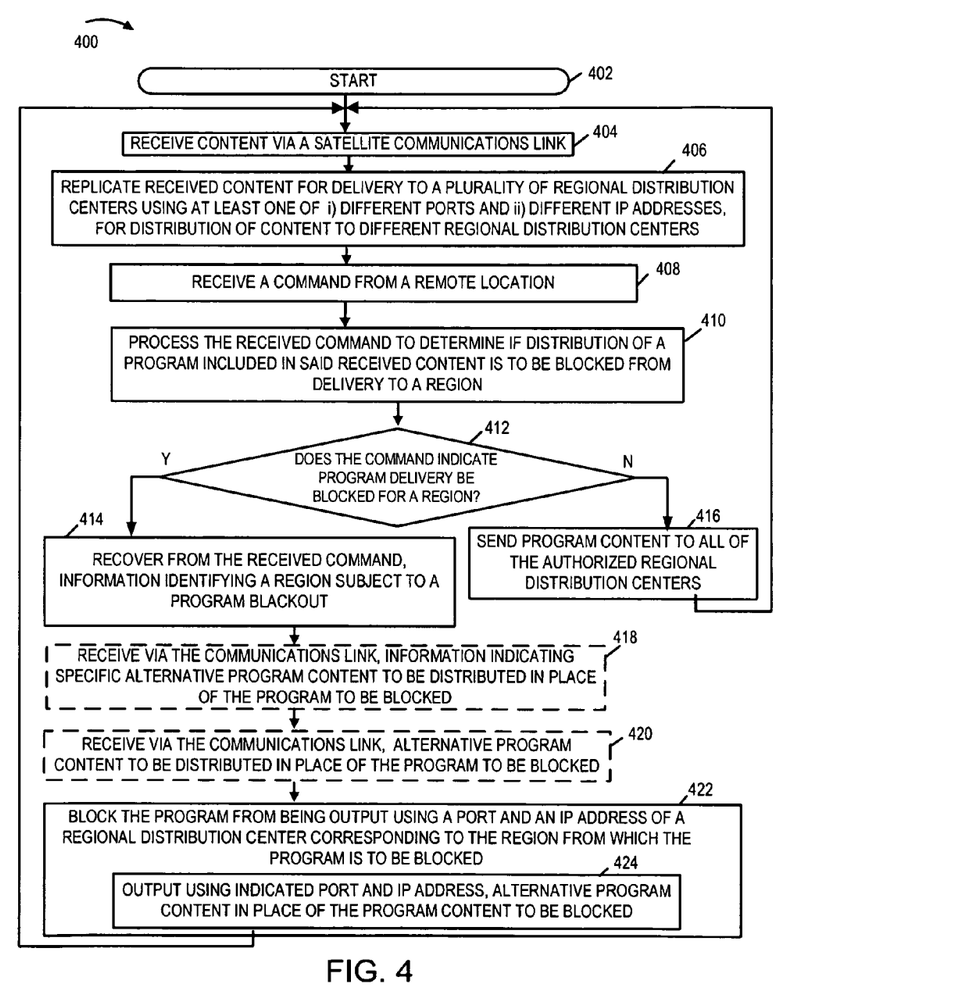
FIG. 4 is a flowchart of an exemplary method of operating a distributor network headend in accordance with an exemplary embodiment.

FIG. 4 is a flowchart 400 of an exemplary content delivery method where a distributor network headend, e.g., distribution network headend 300 of FIG. 3, may block the delivery of program content to a particular region in accordance with an exemplary embodiment. The distribution network headend 300 is configured to receive program content via satellite from a content source, e.g., a content provider and distribute the program content to a plurality of local distribution centers, e.g., local distribution center 216, etc. Operation of the exemplary method starts in step 402 where the distribution network headend 300 is initialized. Operation proceeds from start step 402 to step 404.

In step 404 the distribution network headend 300 receives program content via a satellite communications link. Operation proceeds from step 404 to step 406.

In step 406 the distribution network headend 300 replicates the received program content for delivery to a plurality of local distribution centers, e.g., local distribution centers 216, 226, etc. The network headend 300 uses at least one of i) different ports and ii) different IP addresses for distribution of content to different regional distribution centers. As discussed earlier in the example of FIG. 3, the distribution network headend 300 includes a content replication module 312 which is configured to carry out the process of replicating the received program content. Operation proceeds from step 406 to step 408.

In step 408, the distribution network headend 300 receives a command from a remote location to block the delivery of the received program content to a particular region or regions. In some embodiments the command is received via the satellite communications link. Operation proceeds from step 408 to step 410.

In step 410 the distribution network headend 300 processes the received command to determine if distribution of a program included in received program content is to be blocked from delivery to a region, e.g., a region subject to a blackout of the particular program content. In some embodiments the received program content includes multiple programs that may, and sometimes are identified by, e.g., different program IDs. The multiple programs may include movies, soap operas, pay-per-view programs, on-demand programs etc. In order to control the selective blocking of content distribution, a command received by the distributor headend may, and sometime does, include, e.g., a program ID identifying a program included in said received content to be blocked from delivery to a particular region identified in the command. In some embodiments the received command indicates the region to which the content delivery is to be blocked by specifying at least one of: i) a port number and ii) an IP address corresponding to the region to which content delivery is to be blocked. In some embodiments, received command includes information identifying both the port number and IP address. In other embodiments, the command indicates the region to be blocked by one or more other identifiers, e.g., by the name of the region. Operation proceeds from step 410 to step 412.

In step 412 the distribution network headend 300 determines and makes a decision whether or not program delivery is to be blocked for a region, based on the processing performed by the distributor headend in step 410. When the received command does not indicate that a program delivery be blocked for any region, operation proceeds from step 412 to 416.

Where the program content is distributed to a plurality of regional/local distribution centers. The operation then proceeds from step 416 back to step 404.

In step 412, if the command indicates program delivery for a region is to be blocked, operation proceeds to step 414 rather than 416. In step 414 the distributor headend recovers from the received command, information identifying a geographic region subject to a program blackout. The information may be a port number and IP address corresponding to a local content distribution center serving the region from which program delivery is to be blocked. Operation proceeds from step 414 to step 418.

In optional step 418 the distribution network headend 300 receives, via the satellite communications link, information indicating specific alternative program content to be distributed in place of the program to be blocked. For example in some embodiments where it is desired to block delivery of a program to a region, a content provider may send information to the distribution network headend 300 regarding the alternative program that should be distributed in place of the blocked program. In some such embodiments, the distribution network headend 300 may already have the alternative program content in a storage device, e.g., locally stored content 334 of FIG. 3. However in some other embodiments, the alternative program content may not be locally stored in the distribution network headend 300 in which case the distributor headend may, and sometimes does request the alternative program from an outside server, e.g., a national content server. Alternatively in some other embodiments, the content provider communicates the alternative program content to the distribution network headend 300 for distribution. In some embodiments, the information indicating specific alternative program content is included in the received command. In cases where alternative program content is not specified, the distribution network headend 300 may select content to be distributed in place of the blacked out content. Operation proceeds from step 418 when implemented to optional step 420.

In step 420, the distribution network headend 300 receives, via the satellite communication link, alternative program content to be distributed in place of the program to be blocked. It should be appreciated that step 420 is an optional step in some embodiments, i.e., in some embodiments the content provider does not communicate the alternative program content to the distribution headend via the satellite link. In some embodiments, a received command specifies the alternative program content to be displayed but the content is not supplied by the satellite link. The alternative content may and sometimes is identified by, e.g., an alternative program/substitute program ID, which helps a program recovery module 310 in the distribution network headend 300 to identify and retrieve the alternative program content. In some embodiments, the alternative program is stored in the distribution headend 300 memory as, e.g., locally stored content 334. The operation proceeds from optional step 420 to step 422. In some embodiments where the optional steps 418 and 420 are not used, operation proceeds directly from step 414 to step 422.

In step 422, using the information recovered from the received command, the distribution network headend 300 blocks the program from being output using a port and/or an IP address corresponding to a local distribution center corresponding to the geographic region subject to the program blackout. In some embodiments, step 422 includes sub-step 424 which may, and sometimes is, performed. In sub-step 424 the distribution network headend 300 outputs the alternative program content in place of the program content to be blocked using the port and/or IP address information corresponding to the geographic region subject to the program blackout.

Figure 5:
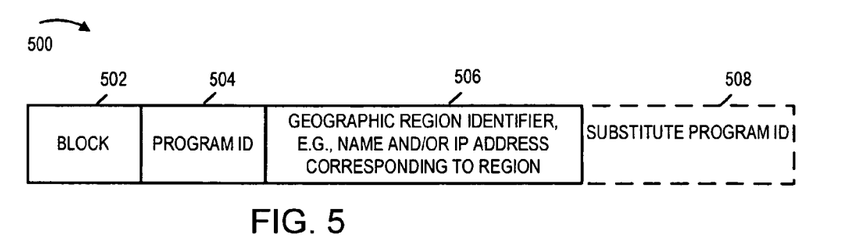
FIGS. 5, 6 and 7 illustrate formats of various commands which can be used in the exemplary system of FIG. 2 to block delivery of program content to one or more geographic regions.
Figure 6:
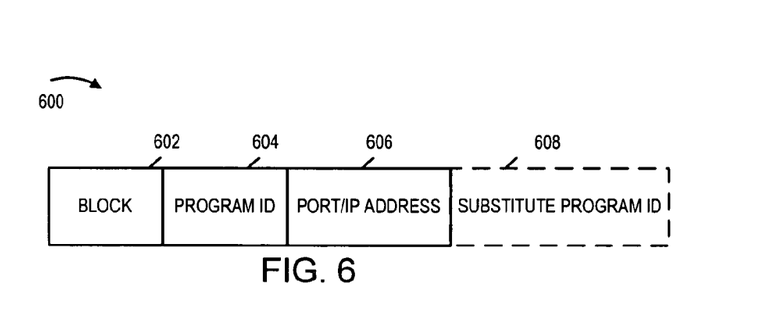
Figure 7:
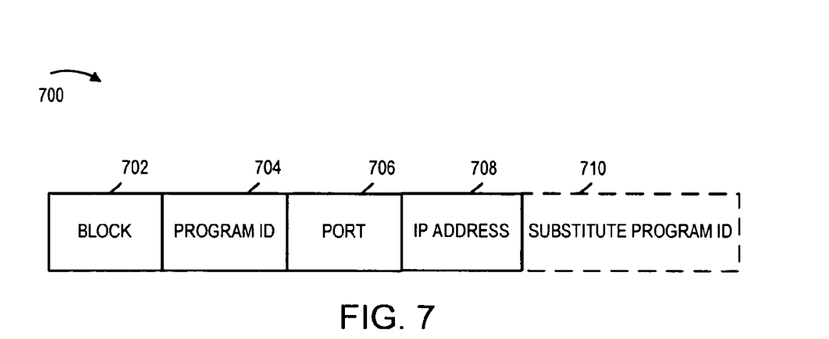

FIGS. 5, 6 and 7 illustrate different exemplary command formats for commands to block delivery of program content which may be used in various exemplary embodiments.

FIG. 5, illustrates the format of an exemplary command 500, to block delivery of program content in accordance with a first exemplary embodiment. As shown in FIG. 5, the exemplary command 500 include fields 502, 504, 506 and optionally 508.

Field 502 is a command type indicator field which indicates that command 500 is a block command used to block program content from being delivered to a particular geographic region, e.g., a region subject to a program blackout. Field 504 is a program ID field which includes information identifying the specific program, which is to be blocked from being delivered to a geographic region or regions indicated in the message. In some embodiments, field 504 includes a program identifier number. Field 506 is a geographic region identifier field. The geographic region identifier field 506 identifies the geographic region subject to a program blackout. The region subject to the blackout may be identified by a name or IP address, and/or port number corresponding to a geographic region and/or local content distribution center serving the region. In some embodiments, the distributor is able to identify a geographic region even if only the name of that region is provided in the command. In some such embodiments, the distribution network headend uses the stored information 338 regarding different geographic regions served by different local/regional distribution centers. In such embodiments the distributor headend may, and sometimes does, further include means for determining, from the geographic region identifier, e.g., information in field 506, an IP address of a distribution center serving the identified geographic region. For example in some embodiments the distributor headend includes an IP address look-up module, e.g., look-up module 307, configured to determine, from the geographic region identifier, an IP address of a distribution center serving the identified geographic region Field 508 is an optional substitute program ID field. Accordingly it may be, and sometimes is, present in some embodiments while not present in some other embodiments. The substitute program ID field 508 includes information identifying a substitute program content, e.g., an alternative program to be distributed to the region subject to the program blackout in place of the program to be blocked. Thus, the substitute program ID field 508 enables the distributor headend to identify substitute/alternative program content to be output in place of the program content being blocked.

FIG. 6, illustrates format of another exemplary command 600, to block delivery of program content in accordance with another exemplary embodiment. In accordance with the present invention, in some embodiments, a command received by the distributor headend indicates the region to which content delivery is to be blocked by specifying at least one of: i) port number and ii) an IP address corresponding to the region to which content delivery is to be blocked. As shown in FIG. 6, the exemplary command 600 include different fields 602, 604, 606 and 608, each including different information and/or instruction for performing a function. As can be seen from FIG. 6, the three fields in the exemplary command 600, i.e., field 602, 604 and 608 are similar to the fields 502, 504 and 508, even though these fields have been identified using different numerals.

Field 602 indicates that command 600 is a command for blocking program content from being delivered to a region indicated in the message.

Program ID field 604 indicates the program to be blocked while field 606 specify at least one of i) port number and ii) an IP address corresponding to the region to which content delivery is to be blocked. Providing the region information in this manner eliminates the need for the distribution network headend to determine this information based on the name of a region and can simplify the implementation of the blocking and program substitution operation. In some embodiments field 606 includes either a port number or an IP address corresponding to the region to which content delivery is to be blocked.

Optional substitute program ID field 608 when present indicates the program to be output in place of the blocked program content.

FIG. 7 illustrates a format of another exemplary command 700, to block delivery of program content in accordance with yet another exemplary embodiment. The command 700 includes command identifier 702, program identifier 704, optional substitute program ID 710 and both a port number and IP address field 706, 708 used to indicate the region subject to the indicated program blackout. The port number field 706 indicates the output port at the distribution network headend 300 corresponding to the local region subject to the blackout while the IP address field 708 is an address of the local distribution center in the geographic region subject to the blackout. Using the port and/or IP address, distribution of the blacked out program content to the geographic region subject to the blackout, can be achieved and alternative content can optionally be delivered in place of the blacked out program content.

While described in the context of a video delivery system, it should be appreciated that the methods and apparatus of the present invention are not limited to the delivery of video content and can be used to support delivery of audio content and/or other types of information content which may be subject to regional blackouts and/or other delivery restrictions.

In various embodiments system elements described herein are implemented using one or more modules which are used to perform the steps corresponding to one or more methods of the present invention. Each step may be performed by one or more different software instructions executed by a computer processor, e.g., a central processing unit (CPU) such as processor 306.

At least one system implemented in accordance with the present invention includes individual means for implementing each of the various steps which are part of the methods of the present invention. Each means may be, e.g., an instruction, processor, hardware circuit and/or combination of such elements used to implement a described step.

The commands described herein are often buffered and/or stored in memory. Accordingly some embodiments are directed to a machine readable medium including the commands discussed herein being stored on the machine readable medium. Many of the above described methods or method steps can be implemented using machine, e.g., computer, executable instructions, such as software, included in a machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A content delivery method, the method comprising:
receiving content, at a network headend, via a communications link;
replicating received content at the network headend for delivery to a plurality of local distribution centers, said network headend using at least one of i) different ports or ii) different IP addresses for distribution of content to different local distribution centers;
communicating separate individual copies of the received content to different local distribution centers using: i) different ports at the network headend or ii) different port and IP address combinations;
processing, at said network headend, a command received from a remote location to determine if distribution of a program included in said received content is to be blocked from delivery to a region; and
when the received command indicates that a program included in said received content is to be blocked from delivery to a region, blocking, at said network headend, said program from being output using a port and an IP address used to deliver content to a local distribution center corresponding to the region from which the program is to be blocked while proceeding with outputting of said replicated copies of said content using a port and IP address used to deliver content to a different local distribution center.

2. The method of claim 1, wherein said communications link is a satellite communications link.

3. The method of claim 1,
wherein said different regions are serviced by different local distribution centers; and
wherein replicating received content at said network headend includes generating multiple individual copies of the received content.

4. The method of claim 1,
wherein said local distribution center is a local cable network headend; and
wherein said received command indicates the region to which content delivery is to be blocked by specifying: i) a port number and ii) an IP address corresponding to said region to which content delivery is to be blocked.

5. The method of claim 1, wherein said one of said local distribution centers is one of a plurality of distribution centers from which said program is to be blocked.

6. The method of claim 1, further comprising:
receiving said command via the communications link, wherein said communications link is a satellite communications link.

7. The method of claim 6, wherein said command includes information identifying both the port number and the IP address, the method further comprising:
recovering from the received command the information identifying the port number and IP address corresponding to said region from which delivery of a program is to be blocked; and
wherein blocking said program includes: outputting, using the indicated port and IP address, alternative program content in place of the program content to be blocked.

8. The method of claim 7, further comprising:
receiving via said satellite communications link, information indicating specific alternative program content to be distributed in place of the program which is to be blocked.

9. The method of claim 8, further comprising:
receiving via said satellite communications link, the alternative program content to be distributed in addition to receiving said program which is to be blocked.

10. The method of claim 9, wherein said specific alternative programming content is locally stored programming content.

11. A content delivery system, comprising:
a receiver, at a network headend, for receiving content via a satellite communications link;
a replication circuit, at said network headend, configured to replicate received content for delivery to a plurality of local distribution centers, using at least one of i) different ports or ii) different IP addresses for distribution of content to different local distribution centers;
a program content distribution control circuit configured to control said content delivery system to communicate separate individual copies of the received content to different local distribution centers using: i) different ports at the network headend or ii) different port and IP address combinations;
a command recovery processor, at said network headend, configured to process a command received from a remote location to determine if distribution of a program included in said received content is to be blocked from delivery to a region; and
wherein when the received command indicates that a program included in said received content is to be blocked from delivery to a region, said distribution control circuit is further configured to block, at said network headend, said program content said program from being output using a port and an IP address used to deliver content to a local distribution center corresponding to the region from which the program is to be blocked while proceeding with outputting of said replicated copies of said content using a port and IP address used to deliver content to a different local distribution center.

12. The content delivery system of claim 11, wherein said receiver is a satellite receiver.

13. The content delivery system of claim 11,
wherein said different regions are serviced by different local distribution centers;
wherein said distribution network headend includes a plurality of switching and packetization devices, different local distribution centers corresponding to different ones of said multiple switching and packetization devices;
wherein a first switching and packetization device in said plurality of switching and packetization devices is responsive to a first control signal from said command recovery processor to make a first selection between substitute content and replicated content, to packetize the first selected one of the substitute content and replicated content and to stream the packetized first selected one of the substitute content and replicated content to a first local distribution center; and
wherein a second switching and packetization device in said plurality of switching and packetization devices is responsive to a second control signal from said command recovery processor to make a second selection between substitute content and replicated content, to packetize the second selected one of the substitute content and replicated content and to stream the packetized second selected one of the substitute content and replicated content to a second local distribution center which is at a different location than said first local distribution center.

14. The content delivery system of claim 11, wherein said program content distribution control circuit is responsive to received commands from said command recovery processor.

15. The content delivery system of claim 11, wherein said received command indicates the region to which content delivery is to be blocked by specifying: i) a port number and ii) an IP address corresponding to said region to which content delivery is to be blocked; and wherein different port number and IP address combinations correspond to different local distribution centers.

16. The content delivery system of claim 14, wherein said one of said local distribution centers is one of a plurality of distribution centers from which said program is to be blocked.

17. The content delivery system of claim 14, wherein said command includes information identifying a geographic region from which content is blocked, the system further comprising:
an IP address look-up module, at said network headend, for determining from the information identifying a geographic region, an IP address of a distribution center serving the identified geographic region.

18. The content delivery system of claim 17, wherein said information identifying a geographic region is a name of the geographic region.

19. The content delivery system of claim 11, wherein said receiver is further adapted to receive information indicating specific alternative program content to be distributed in place of the program which is to be blocked.

20. The content delivery system of claim 19, further comprising:
a content substitution module for outputting the alternative program content using the port and IP address corresponding to the geographic region for which a command indicates program content is to be blocked.

21. The content delivery system of claim 19, further comprising:
memory for storing the alternative programming content, said alternative programming content being received via said satellite link.

22. The content delivery system of claim 21, wherein said specific alternative programming content is locally stored programming content.

23. A content delivery system, the comprising:
a receiver, at a network headend, for receiving content via a satellite communications link;
a content replication hardware circuit, at said network headend, for replicating received content for delivery to a plurality of local distribution centers, using at least one of i) different ports or ii) different IP addresses for distribution of content to different local distribution centers;
content distribution control hardware circuit for controlling the content delivery system to communicate separate individual copies of the received content to different local distribution centers using: i) different ports at the network headend or ii) different port and IP address combinations;
a command recovery hardware circuit, at said network headend, for processing a command received from a remote location to determine if distribution of a program included in said received content is to be blocked from delivery to a region; and
wherein when the received command indicates that a program included in said received content is to be blocked from delivery to a region, said content distribution control hardware circuit is further configured to block, at said network headend, said program content said program from being output using a port and an IP address used to deliver content to a local distribution center corresponding to the region from which the program is to be blocked while proceeding with outputting of said replicated copies of said content using a port and IP address used to deliver content to a different local distribution center.

24. The content delivery system of claim 23, wherein said different regions are serviced by different local distribution centers.

25. The content delivery system of claim 23, wherein said content distribution control hardware circuit for controlling the content delivery system is responsive to received commands from said command recovery hardware circuit.

* * * * *